(12) United States Patent
Meyer

(10) Patent No.: US 12,359,749 B1
(45) Date of Patent: Jul. 15, 2025

(54) CABLE MANAGEMENT ASSEMBLY AND ASSOCIATED METHOD OF USING THE SAME

(71) Applicant: Jeremy Meyer, Holland, MI (US)

(72) Inventor: Jeremy Meyer, Holland, MI (US)

(\*) Notice: Subject to any disclaimer, the term of this patent is extended or adjusted under 35 U.S.C. 154(b) by 0 days.

(21) Appl. No.: 18/380,748

(22) Filed: Oct. 17, 2023

Related U.S. Application Data

(63) Continuation of application No. 17/831,630, filed on Jun. 3, 2022, now Pat. No. 11,788,648.

(60) Provisional application No. 63/337,287, filed on May 2, 2022.

(51) Int. Cl.
 *F16L 3/10* (2006.01)
 *F16M 13/02* (2006.01)

(52) U.S. Cl.
 CPC .......... *F16L 3/1091* (2013.01); *F16M 13/02* (2013.01)

(58) Field of Classification Search
 CPC .......... F16L 3/1091; F16M 13/02; H02G 3/10
 See application file for complete search history.

(56) References Cited

U.S. PATENT DOCUMENTS

| | | | | |
|---|---|---|---|---|
| 2,872,504 A | * | 2/1959 | Woodring | H02G 3/0683 174/663 |
| 3,197,548 A | * | 7/1965 | Weitzman | H02G 3/10 174/53 |
| 3,728,470 A | | 4/1973 | Maier | |
| 3,890,459 A | | 6/1975 | Caveney | |
| 3,909,101 A | * | 9/1975 | Bruels | H02G 3/10 439/465 |
| 4,081,659 A | * | 3/1978 | Kemp | A47J 31/44 439/456 |
| 4,210,380 A | * | 7/1980 | Brzostek | H01R 13/58 439/456 |
| 4,295,575 A | * | 10/1981 | Flachbarth | H02G 3/10 220/3.94 |
| 4,482,200 A | * | 11/1984 | Willenborg | H01R 13/516 439/571 |
| 4,721,268 A | | 1/1988 | Lerner et al. | |
| 4,944,694 A | * | 7/1990 | Dorn | H01R 13/72 439/501 |
| 5,038,000 A | * | 8/1991 | Westbrook | H02G 3/18 174/563 |
| 5,280,132 A | | 1/1994 | Clarey et al. | |
| 5,307,243 A | | 4/1994 | Sharp et al. | |
| 5,600,098 A | | 2/1997 | Kazaks | |
| 5,848,914 A | * | 12/1998 | Lang | H01R 13/6592 439/607.47 |
| 6,227,502 B1 | | 5/2001 | Derman | |
| 6,238,235 B1 | | 5/2001 | Shavit et al. | |
| 6,285,565 B1 | | 9/2001 | Aberg et al. | |
| 6,360,051 B1 | | 3/2002 | Daoud | |
| 6,942,189 B2 | * | 9/2005 | Capozzi | H01Q 1/02 248/185.1 |

(Continued)

OTHER PUBLICATIONS

Office Action for U.S. Appl. No. 17/831,630 dated May 25, 2023.

*Primary Examiner* — Eret C McNichols
(74) *Attorney, Agent, or Firm* — King & Partners, PLC

(57) ABSTRACT

A cable management assembly that enables cable connectivity, including management, anti-theft, and damage reduction, having: (a) a housing, wherein the housing is adapted for securement to a substrate; and (b) a cover member, wherein the cover member is adapted for securement to the housing.

1 Claim, 11 Drawing Sheets

(56) References Cited

U.S. PATENT DOCUMENTS

| | | | |
|---|---|---|---|
| 7,381,899 B2 * | 6/2008 | Pfluger | H02G 3/32 |
| | | | 174/92 |
| 7,619,162 B2 | 11/2009 | Dinh et al. | |
| 7,626,118 B1 * | 12/2009 | Capozzi | H02G 3/088 |
| | | | 174/64 |
| D611,326 S | 3/2010 | Alaniz et al. | |
| D626,817 S | 11/2010 | Donowho et al. | |
| D629,289 S | 12/2010 | Krietzman et al. | |
| D630,167 S | 1/2011 | Donowho | |
| 7,997,549 B2 * | 8/2011 | Hopkins | H02G 3/10 |
| | | | 248/220.22 |
| 8,904,605 B2 | 12/2014 | Kawaguchi | |
| 8,964,368 B2 * | 2/2015 | Looney | H04Q 1/06 |
| | | | 174/67 |
| 8,998,151 B2 | 4/2015 | Hoek | |
| 10,433,031 B1 * | 10/2019 | Hudgens | H04Q 1/066 |
| 10,605,380 B1 * | 3/2020 | Cheng | H02G 3/088 |
| 11,058,020 B2 * | 7/2021 | Chang | H02G 3/081 |
| 11,515,693 B2 * | 11/2022 | Wade | H02G 3/22 |
| 11,788,648 B1 | 10/2023 | Meyer | |
| 2004/0094318 A1 * | 5/2004 | Koessler | H02G 3/14 |
| | | | 174/50 |
| 2005/0189453 A1 | 9/2005 | DeGuevara | |
| 2008/0292260 A1 | 11/2008 | Weinegger et al. | |
| 2012/0206874 A1 * | 8/2012 | Huang | H05K 5/0291 |
| | | | 361/679.31 |
| 2021/0218236 A1 * | 7/2021 | Beristany | H02G 3/381 |
| 2021/0328415 A1 * | 10/2021 | Meine | H02G 3/10 |

\* cited by examiner

CABLE MANAGEMENT ASSEMBLY AND ASSOCIATED METHOD OF USING THE SAME

CROSS-REFERENCE TO RELATED APPLICATIONS

This application is a continuation of U.S. application Ser. No. 17/831,630, entitled "CABLE MANAGEMENT ASSEMBLY AND ASSOCIATED METHOD OF USING THE SAME" filed Jun. 3, 2022, now U.S. Pat. No. 11,788,648, which claims the benefit of U.S. Provisional Patent Application Ser. No. 63/337,287, entitled "CABLE MANAGEMENT ASSEMBLY AND ASSOCIATED METHOD OF USING THE SAME," filed May 2, 2022-which are hereby incorporated herein by reference in their entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to cable management assemblies, and, more particularly, to those which provide simple and cost-effective cable connectivity, including management, anti-theft, and damage reduction. The cable management assemblies of the present invention are especially well-suited for academic and business settings where a plurality of different individuals are connecting, for example, their computers to a television and/or monitor throughout the day.

The present invention further relates to methods of using the cable management assemblies disclosed herein.

2. Background Art

Cable organizers, management systems, and associated assemblies have been known in the art for years and are the subject of several patents and publications, including: U.S. Pat. No. 8,998,151 entitled "Cable Organizer," U.S. Pat. No. 8,904,605 entitled "Cord Lock," U.S. Pat. No. 7,619,162 entitled "Dual-Hinge Recessed Outdoor Box and Cover," U.S. Pat. No. 6,360,051 entitled "Splice Holder with Improved Access Feature," U.S. Pat. No. 6,285,565 entitled "Cable Support Apparatus," U.S. Pat. No. 6,238,235 entitled "Cable Organizer," U.S. Pat. No. 6,227,502 entitled "Electrical Cord and Cable Gripper," U.S. Pat. No. 5,600,098 entitled "Electronic Cable Organizer," U.S. Pat. No. 5,307,243 entitled "Wire Management Assembly for an Electrical Distribution Housing," U.S. Pat. No. 5,280,132 entitled "Plastic Enclosure Box for Electrical Apparatus," U.S. Pat. No. 4,721,268 entitled "Modular Power Cord and Cable Organizer," U.S. Pat. No. 3,728,470 entitled "Electrical Outlet Box with Cable Connectors," United States Patent Application Publication Number 2008/0292260 entitled "Cable Management System," and United States Patent Application Publication Number 2005/0189453 entitled "Cable Organizer"—all of which are hereby incorporated herein by reference in their entirety including all references cited therein.

U.S. Pat. No. 8,998,151 appears to disclose a cable organizer that includes a front surface and a rear surface, wherein the front surface and the rear surface define a width therebetween; a first end and a second end, wherein the first end and the second end define a length therebetween; a bottom surface, wherein the bottom surface is adapted for placement proximate a work surface; a top surface, wherein the top surface comprises at least one aperture for receiving a cable therethrough, and wherein the top surface comprises at least one of a tab and detent which is controllably bendable, thereby facilitating releasable insertion of a cable into at least one cable channel such that the cable is retained in the at least one cable channel during normal use and removable by a user upon upward displacement of the cable by the user.

U.S. Pat. No. 8,904,605 appears to disclose a cord lock that includes a male tool and a female tool that receives a part of the male tool by pressing the male tool against a biasing force of a biasing device, and so as to match cord eyelets formed in sides of the male tool and the female tool each other at a predetermined pressing position of the male tool. An engaging part that is engaged with an engaged part of the female tool by the biasing force of the biasing device to prevent the male tool from slipping out of a position before the pressing operation, is formed on a side of the male tool intersecting a direction in which the eyelet passes through, and at a position closer to a pressing backward side than a hole edge located on a pressing forward side of the eyelet.

U.S. Pat. No. 7,619,162 appears to disclose a recessed electrical outlet box which includes a body that is selectably connected to a cover by either a first or a second hinge assembly. The body includes a back wall, a face plate, a side wall and an interior, wherein the side wall extends between the back wall and face plate and the face plate has an opening for accessing the interior. The interior includes a recessed pair of bosses and a pair of mounting holes, which can be used for mounting electrical devices in the interior. The first and second hinge assemblies have a first hinge axis and a second hinge axis, respectively, and are attached to the face plate and cover so that the first hinge axis is substantially perpendicular to the second hinge axis.

U.S. Pat. No. 6,360,051 appears to disclose a splice holder for securing and retaining fiber optic splices. The splice holder improves access to individual splices and minimizes interference to adjacent splices during removal. The splice holder comprises a hollow base having a first flat portion and a second enclosing portion defining a hollow longitudinal space therebetween. A plurality of parallel, spaced apart longitudinal members extend from the second portion away from the hollow space. Adjacent pairs of members define a channel for retaining a splice. Within the hollow space is a transversely extending wall for structural support of the second portion, which divides the space into two cavities. The cavities provide improved access to the underside of a splice.

U.S. Pat. No. 6,285,565 appears to disclose a cable support that is used in a structure for accommodating electronic equipment, for example printed circuit boards in a subrack. The support includes an elongated rail with cable guiding surfaces for guiding a cable rail with cable guiding surfaces for guiding a cable along the structure. At least one pair of curved fingers are arranged with mutual intervals at an angle to the longitudinal axis of said rail. A tongue is located in the interval between two adjacent fingers.

U.S. Pat. No. 6,238,235 appears to disclose a cable organizer that includes an elongate body having two opposite ends, one called a cable receiving end and the other called a terminal receiving end, and a plurality of wire-receiving passages formed in the elongate body and separated from each other by electrically conductive portions in the body, each wire-receiving passage extending from the cable receiving end to the terminal receiving end and being open at both ends, each wire-receiving passage being adapted for guiding therethrough a plurality of wires of a multi-pair communication cable from the cable receiving end to the terminal receiving end, and being adapted for arranging a plurality of wires of a multi-pair communication cable at the terminal receiving end for connection with a modular plug. The wire receiving passages have parallel but not coplanar surface portions that are joined by an intermediate portion. This causes a different wire receiving passage cross-section at the cable-receiving end compared to the terminal-receiving end.

U.S. Pat. No. 6,227,502 appears to disclose a gripper device made of rigid material and having only two members. The two members are basically shaped alike, each having a single, longitudinal axis edge that faces and interlocks slidingly with the other. One of the members has a number of cord or cable retaining cut-outs cut through an axis perpendicular to the sliding axis of the facing members. Provision is made for preventing the relative sliding of the members when cords or cables are being retained by the device, which can be secured by a single lock. The gripper device is small, easy to use and economic to produce.

U.S. Pat. No. 5,600,098 appears to disclose an organizer for securing a plurality of insulated electrical conductors such as PC interconnect and power cables. The organizer comprises a body constructed of a single piece of thin, flat, flexible fabric having a rectangular configuration with first and second end edges and first and second side edges. A fastening mechanism is attached to the side edges to bring them together as the body is wrapped around the cables. The fastening mechanism is preferably a zipper, straps or a hook and loop type fastener. One of more access apertures may be disposed in the body.

U.S. Pat. No. 5,307,243 appears to disclose an electrically-insulating wire management assembly for a metallic electrical distribution device housing. The assembly includes at least one slot having a generally v-shaped length formed at an angle through the cross-section of the assembly's body. Each slot is arranged to receive a flexible electrical conductor through one open side edge of the body and guide the conductor entering through the outer face of the body, across the length of the slot, and exiting through the inner face of the body into the housing interior. The angle of each slot is adapted to provide an interference fit with the conductor. The assembly includes means for securing the assembly to the side wall of the housing in a position allowing the conductor to enter the housing through the assembly. The present invention also includes an electrical distribution device housing adapted for connecting with a wire management assembly. The housing including at least one knock-out or cut-out integrally formed in at least one side wall. Each knock-out or cut-out extends downwardly from the upper edge of the side wall and corresponds in shape to the wire management assembly.

U.S. Pat. No. 5,280,132 appears to disclose a plastic load center box economically provided by duplicate molded end sections joined by an intermediate section of uniform cross-section which is readily provided in selected lengths in either molded or extruded form. End walls receive metal inserts electrically interconnected to provide grounding when attached to grounded conduit, or plastic inserts where the load center application does not require grounded conduit. Molded end sections have formed knockouts and wire clamping tabs. A metal cover for the box is grounded to the metal inserts or to the interconnection. Additional plastic inserts in the end walls provide forwardly open pockets in which cable may be laid, and closing inserts overlying the pockets to grip the cable and retain it in the pockets.

U.S. Pat. No. 4,721,268 appears to disclose a modular power cord and cable organizer including identical elongated containers which can be used singly or attached in multiple units, the combination of which creates a base upon which other objects or small electrical appliances may be placed for convenience. The device allows shortening and efficiently organizing power cords wires and cables especially where a group of small electrical components are used in combination and simultaneously as in, for example, data processing workstations or household work surfaces.

U.S. Pat. No. 3,728,470 appears to disclose an extruded box body with open ends has a bottom wall and a pair of side walls, with opposing channels formed at the inside of the side walls. A pair of separate box ends are provided with keeper members which are received and frictionally held in the channels. One of the side walls has an external mounting flange for securing the box to a supporting stud, and a keeper rib on the bottom wall of the box body is supportably engaged by a special fastener driven into the side of the stud. The box ends have knock-out plugs which when removed, leave openings to receive cable connectors. The openings have diametrically opposed recesses and the connectors have lugs which pass through the recesses and then hold the connectors in place when the latter are turned through 90*.

United States Patent Application Publication Number 2008/0292260 appears to disclose a cable management system for use with a rack having at least a first and a second side configured to be coupled to at least one piece of electronic equipment comprises a first and a second support configured to be disposed along at least a portion of a first and a second side of the rack. The first and second supports each include a strut configured to be secured to a respective side of the rack and an arm support including at least one mounting area. The cable management system also comprises a plurality of arms configured to be removably coupled to the mounting areas of the first and second arm supports. At least one of arms comprises a first and a second row of notches arranged in a first and a second direction, respectively. The first and second rows of notches are configured to engage with at least one cable associated with said at least one piece of electronic equipment.

United States Patent Application Publication Number 2005/0189453 appears to disclose a cable organizer for organizing and retaining cables including a thin sheet of flexible material having at least one opening adjacent an edge of the material. The cable organizer is further comprised of openings arranged along an edge of the cable organizer and in communication with the edge to allow the passage of a cable into the opening. The openings are sized to prevent the passage of a cable connector such that a cable connector located on the end of the cable is unable to pass through the opening. Thus, the cable end may be retained by the cable organizer in a convenient position for future re-connection. The cable organizer may also include an adhesive strip for adhering the cable organizer to an object.

While the above-identified patents and publications do appear to disclose various cable organizers, management systems, and associated assemblies, their configurations remain non-desirous and/or problematic inasmuch as, among other things, none of the above-identified cable assemblies provide for simple and cost-effective cable connectivity, including management, anti-theft, and damage reduction as disclosed herein.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a cable management assembly that enables cable connectivity, including management, anti-theft, and damage reduction, comprising, consisting essentially of and/or consisting of: (a) a housing, wherein the housing is adapted for securement to a substrate; and (b) a cover member, wherein the cover member is adapted for securement to the housing.

In a preferred embodiment of the present invention, the housing includes a cavity defined by a top side wall, a left side wall, a right side wall, a bottom side wall, a bottom wall, a top wall, and the cover member.

In another preferred embodiment of the present invention, the cavity is adapted to retain two or more cables connected directly or indirectly.

In yet another preferred embodiment of the present invention, displacement of the two or more connected cables positioned in the cavity is restricted such that the cables cannot become disconnected.

In a preferred implementation of the present invention, the walls that define the cavity and the cover member enable at least one cable to be wrapped therearound in a hidden, stored configuration.

In another preferred implementation of the present invention, the housing includes first and second primary bores that enable the housing to be secured to a substrate (e.g., a wall, a partition, a door, etcetera) via fasteners.

In yet another preferred implementation of the present invention, the housing includes first and second secondary bores that enable the housing to be secured to a conventional receptable box via fasteners.

In one preferred implementation of the present invention, the top side wall of the housing includes an aperture that is adapted to accommodate cable while preventing a cable connector from passing therethrough.

In one preferred aspect of the present invention, the bottom side wall of the housing includes an aperture that is adapted to accommodate cable while preventing a cable connector from passing therethrough.

In a preferred embodiment of the present invention, the bottom wall of the housing includes a pair of apertures that are adapted to accommodate both a cable connector and the cable itself.

In another preferred embodiment of the present invention, the top wall of the housing includes a lip that is adapted to help retain a cable connector positioned within the cavity during installation.

In yet another preferred embodiment of the present invention, the top wall of the housing includes a plurality of apertures for securing the cover member thereto via fasteners.

In a preferred implementation of the present invention, the cover member includes a plurality of apertures.

In another preferred implementation of the present invention, the housing and cover member are independently fabricated from a material selected from the group consisting of a leather, a natural fabric, a synthetic fabric, a metal, a metal alloy, a natural resin, a synthetic resin, a plastic, a composite, and/or wood.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
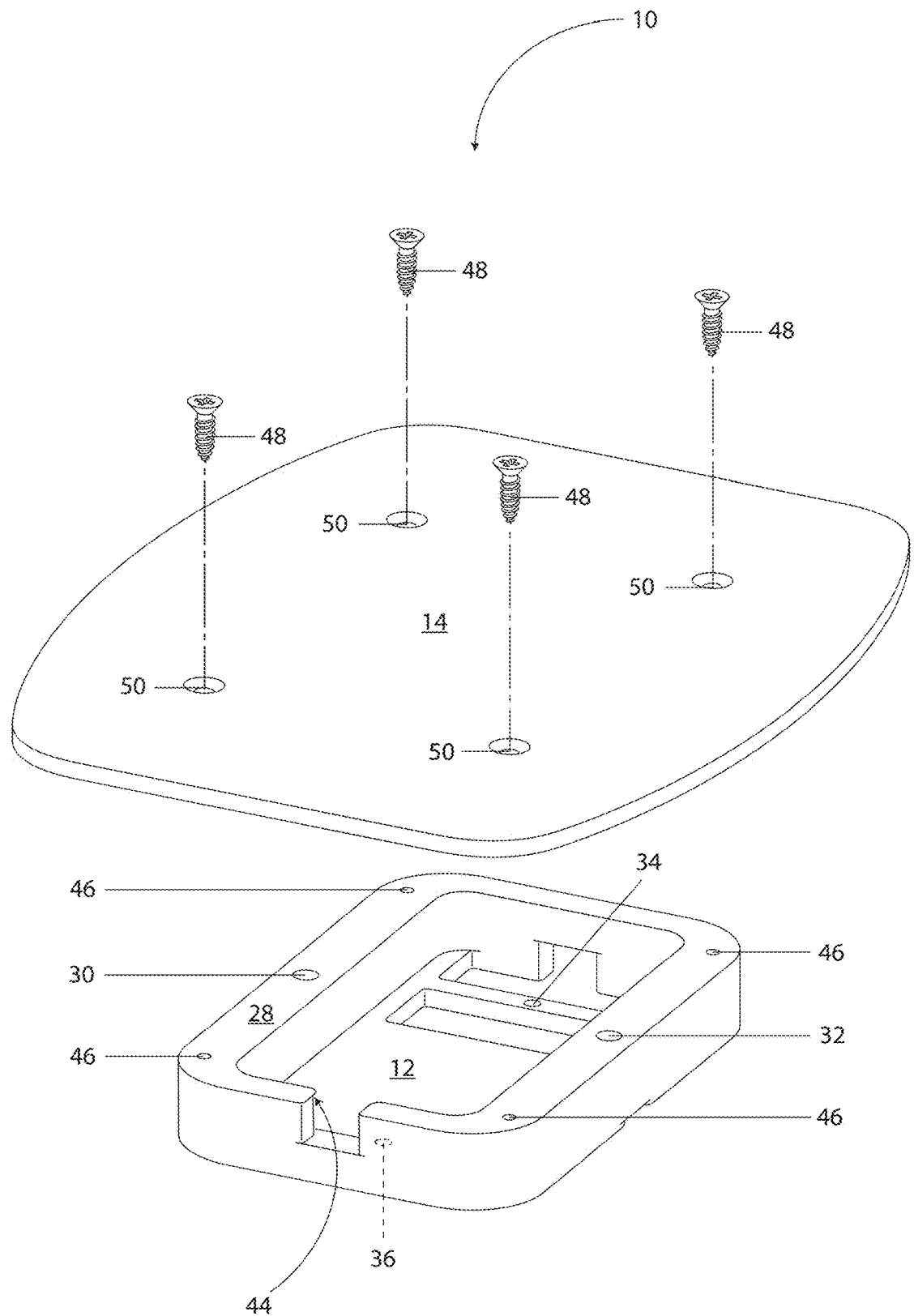
Figure 2:
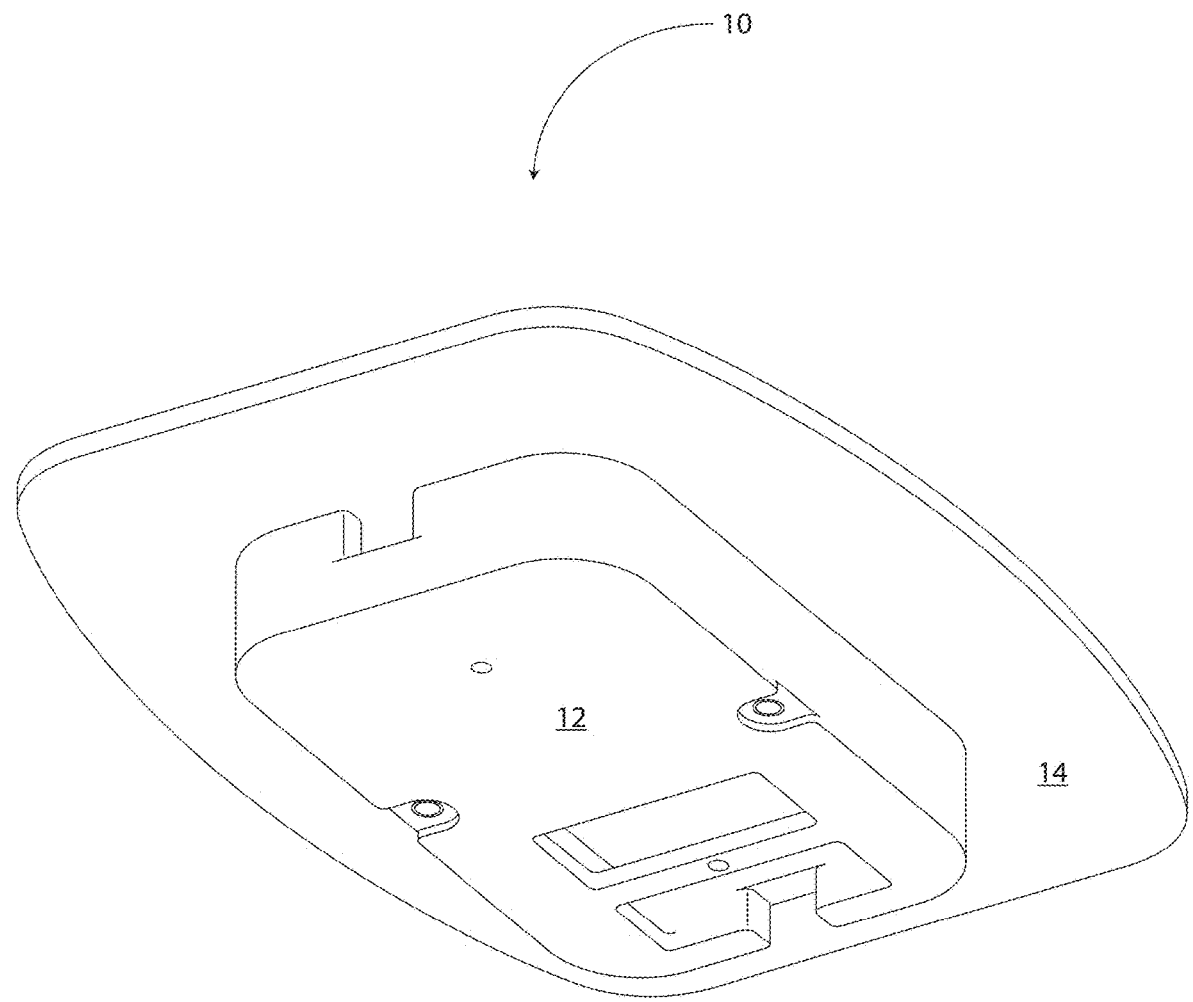
Figure 3:
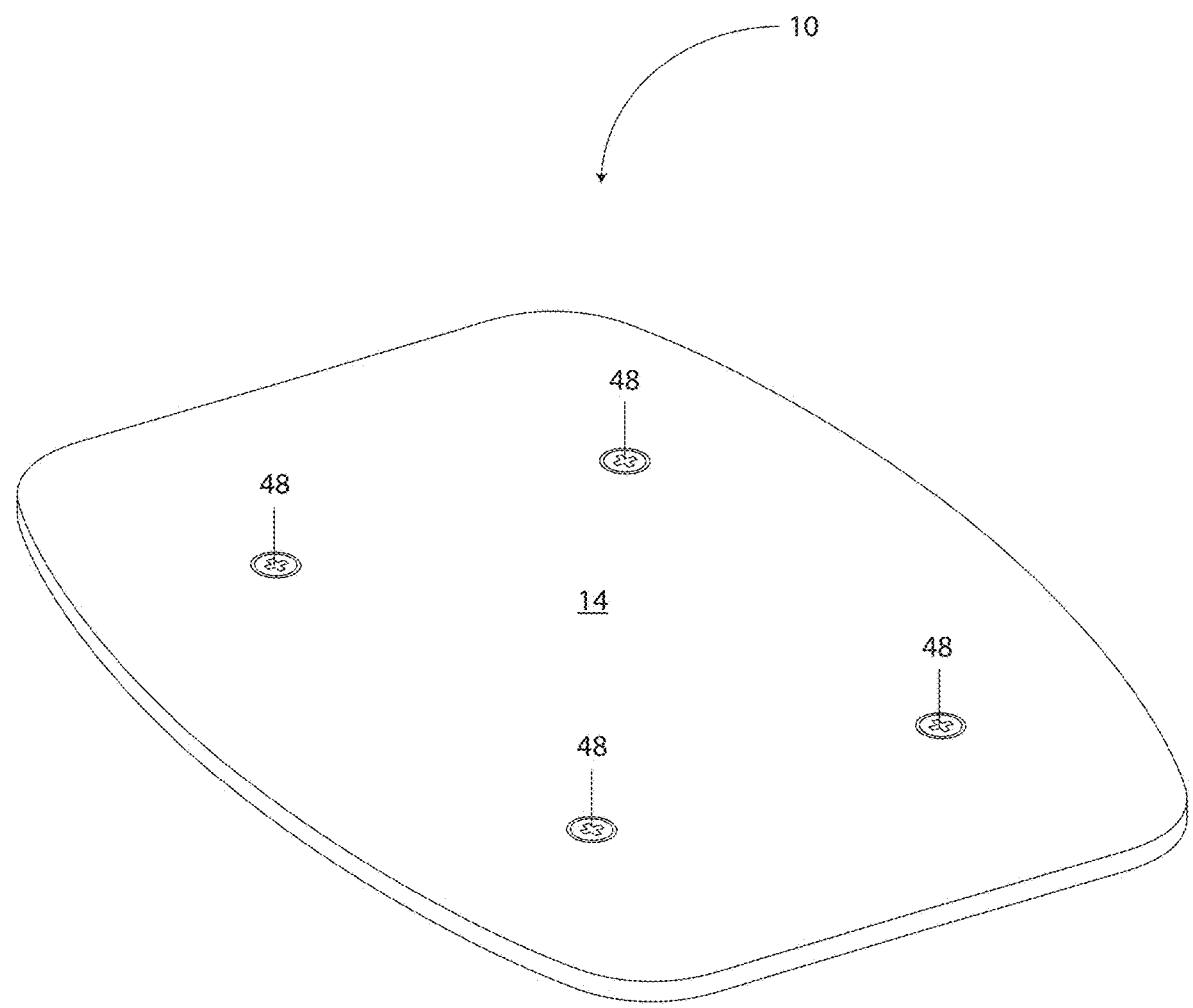
Figure 4:
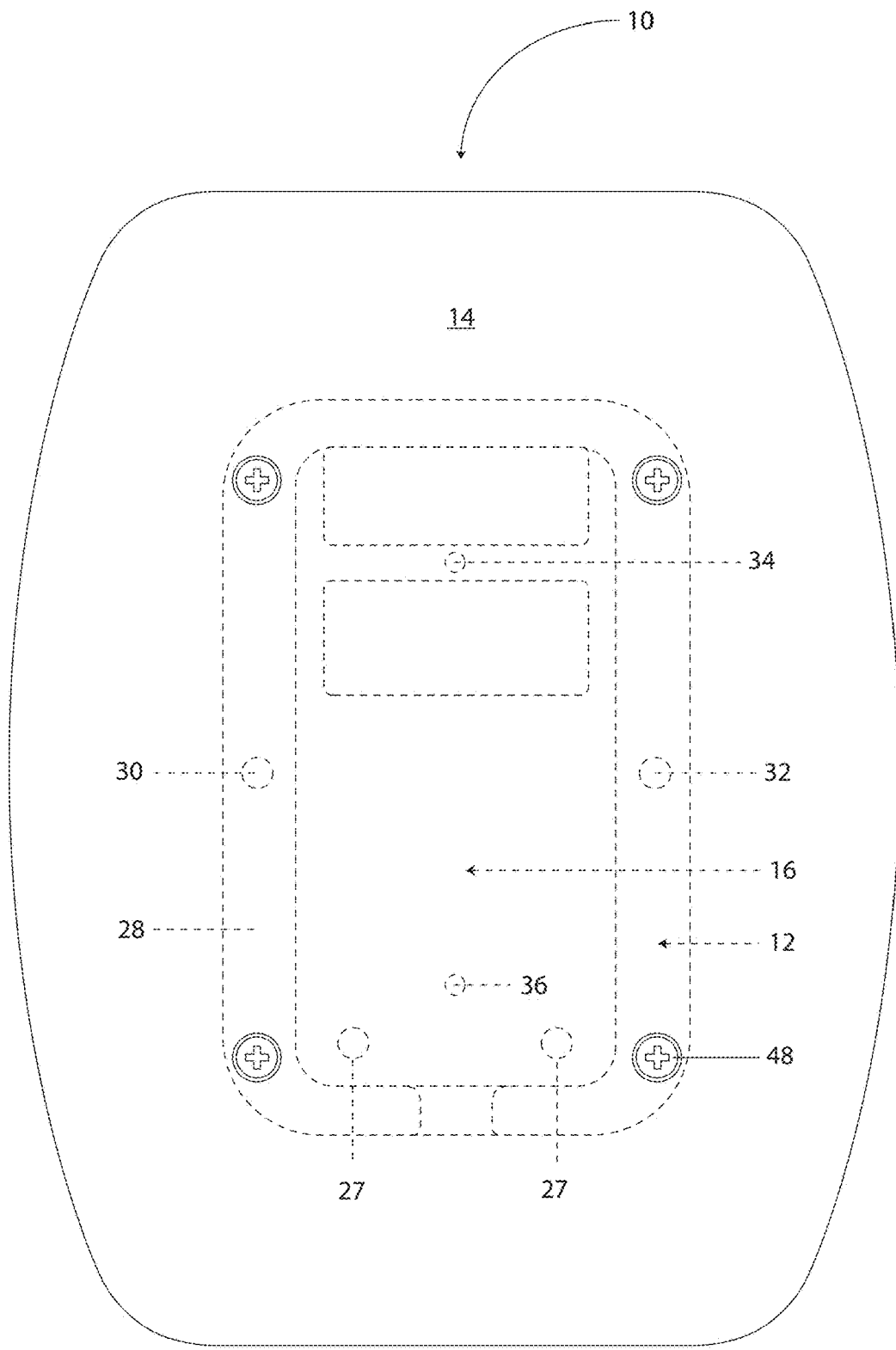
Figure 5:
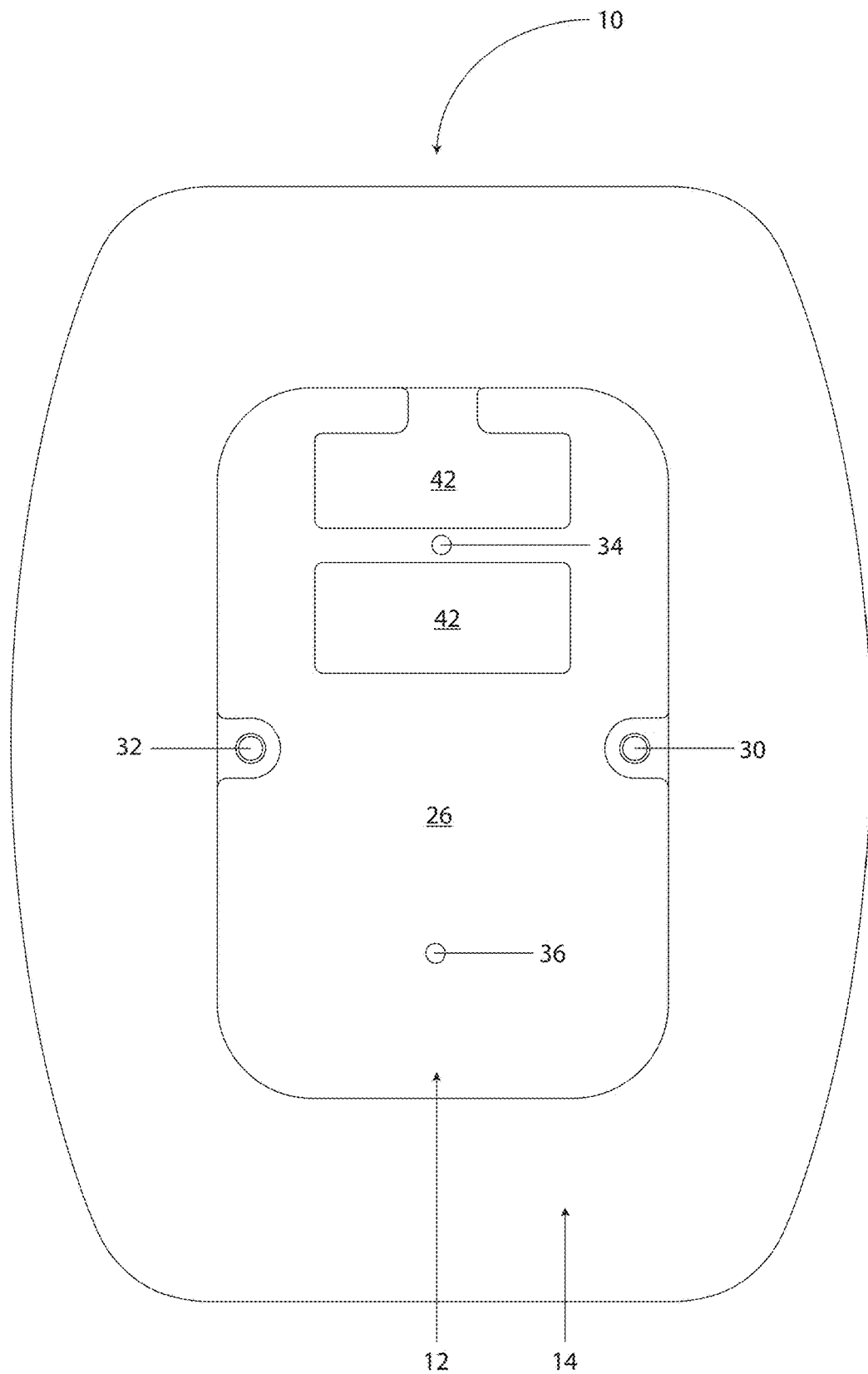
Figure 6:
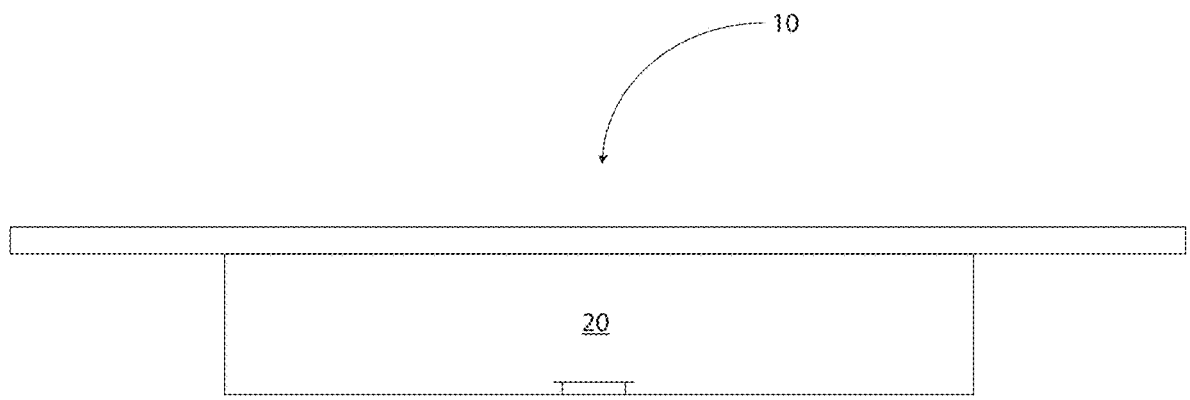
Figure 7:
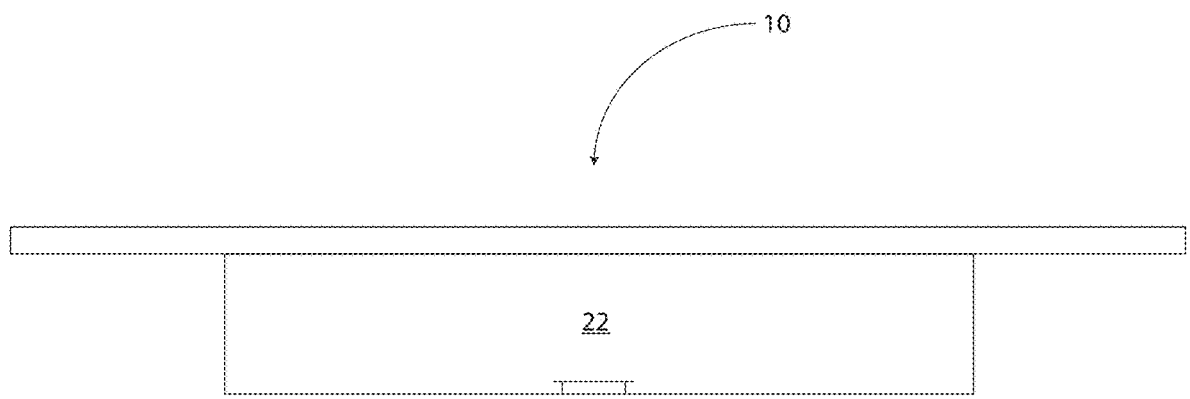
Figure 8:
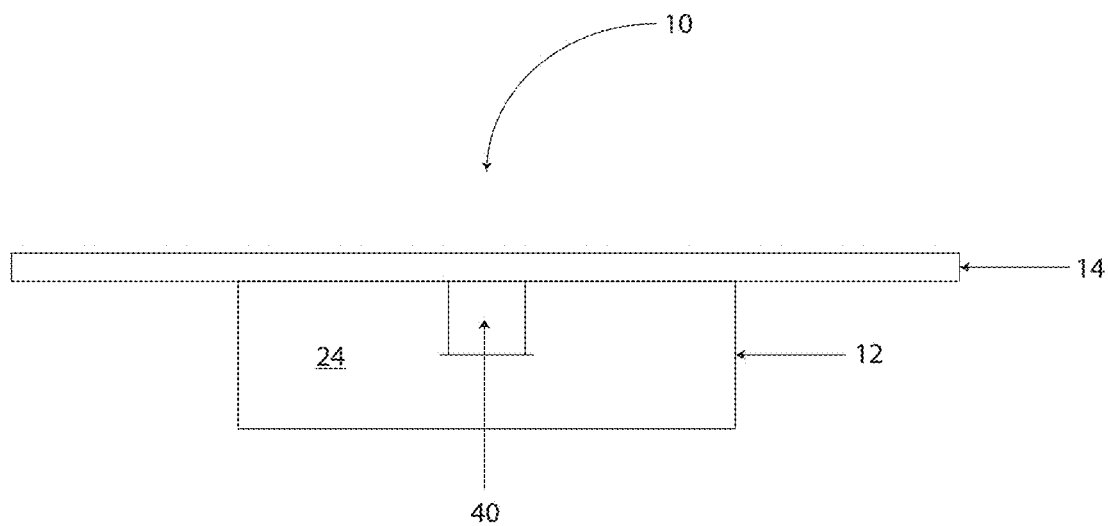
Figure 9:
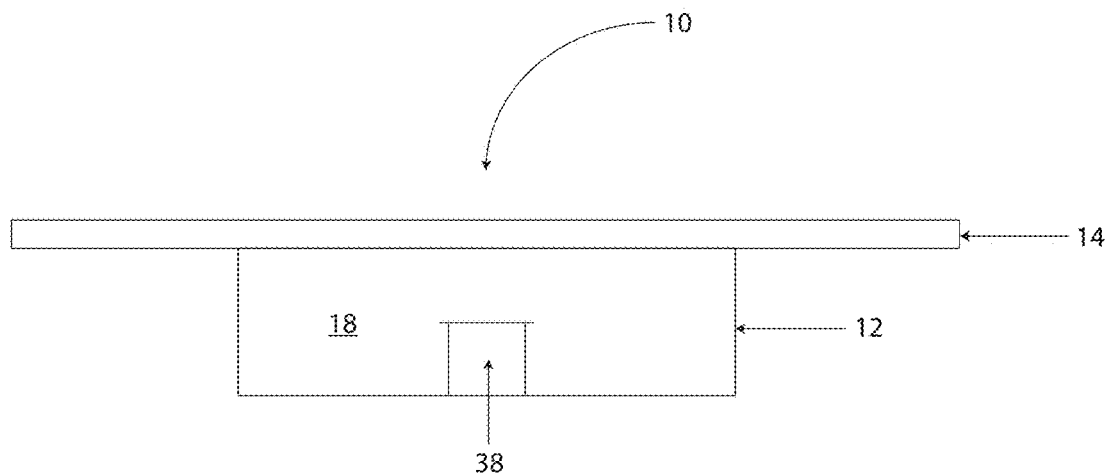
Figure 10:
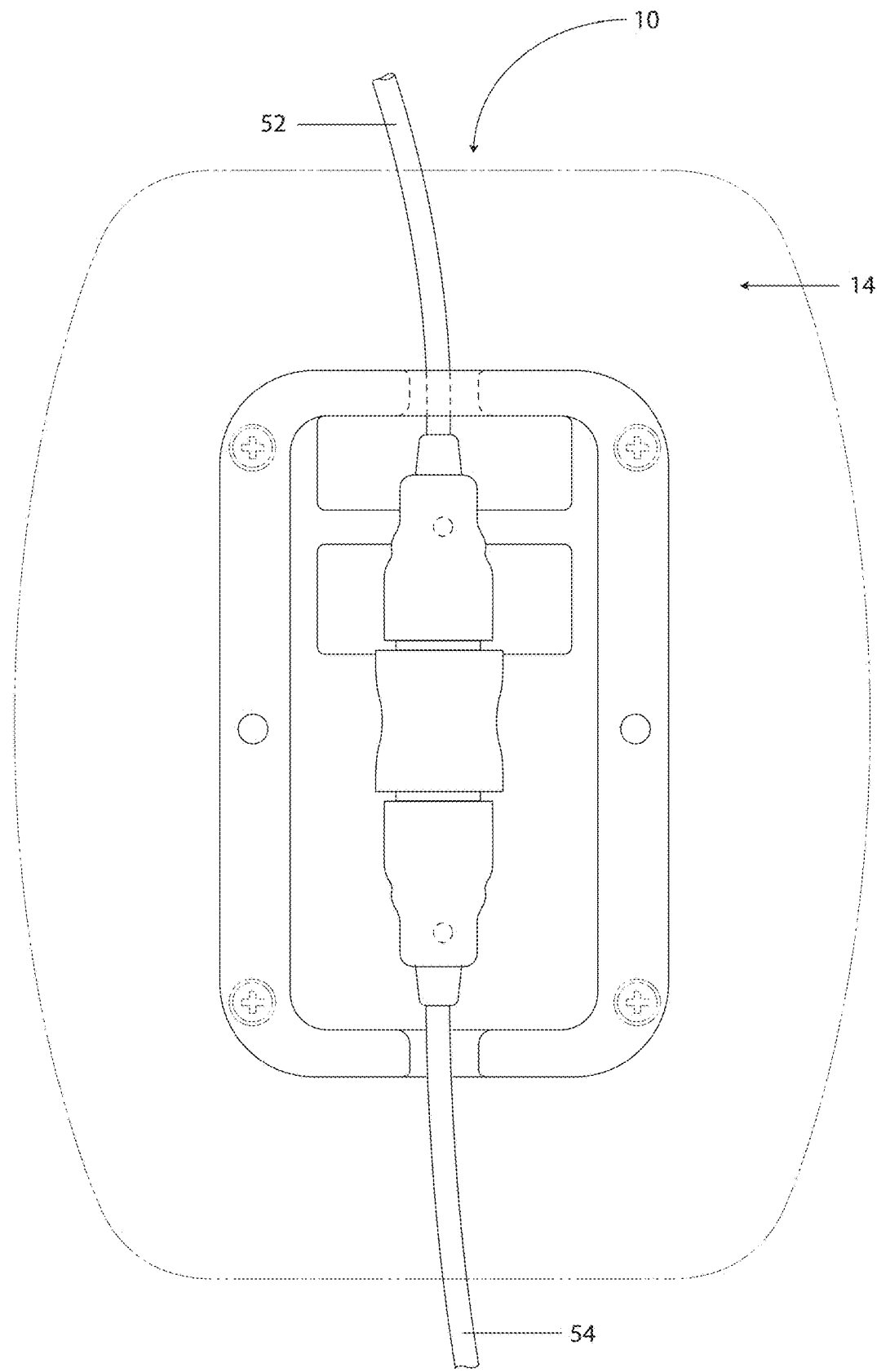
Figure 11:
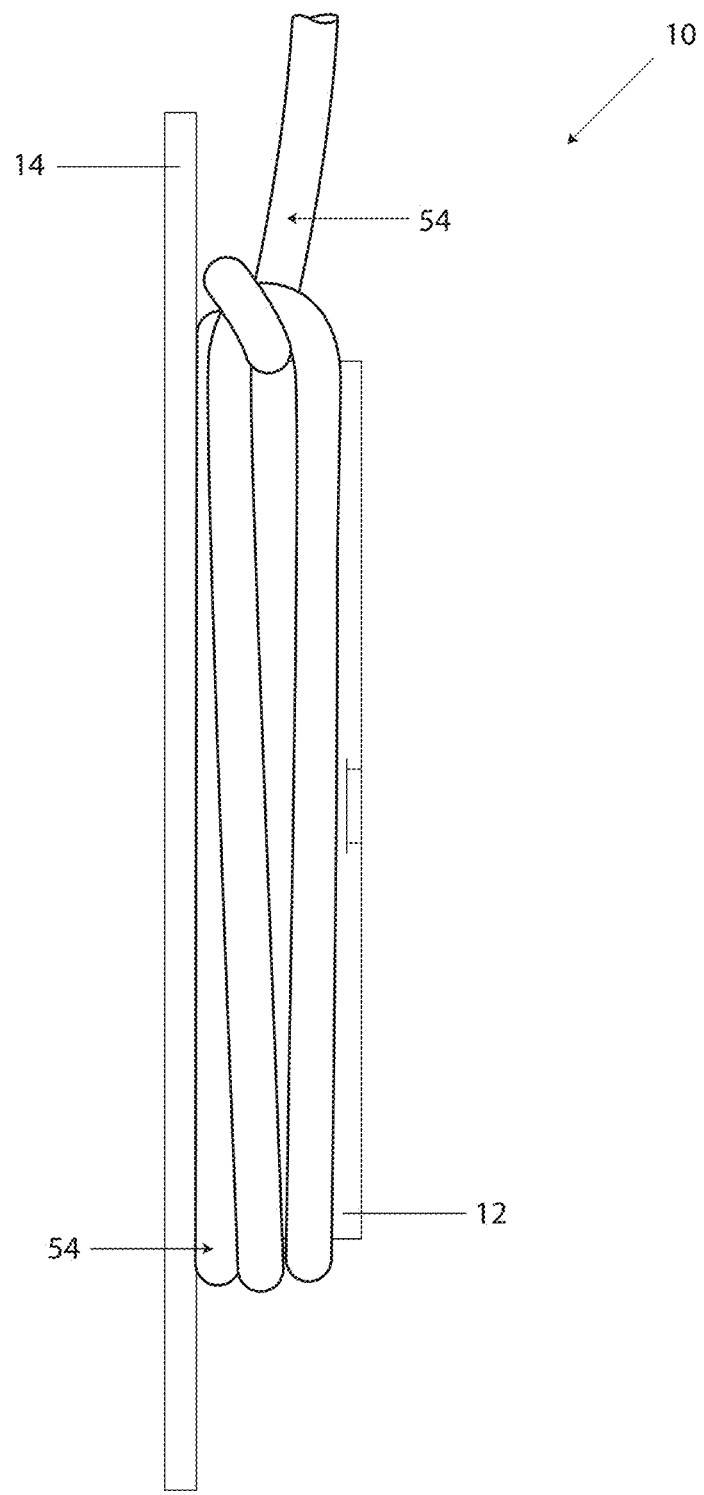

The invention will now be described with reference to the drawings wherein:

FIG. 1 of the drawings is an unassembled perspective view of a first embodiment of a cable management assembly manufactured in accordance with the present invention;

FIG. 2 of the drawings is an assembled front, lower perspective view of the cable management assembly of FIG. 1;

FIG. 3 of the drawings is an assembled front, upper perspective view of the cable management assembly of FIG. 1;

FIG. 4 of the drawings is a top plan view of the cable management assembly of FIG. 1;

FIG. 5 of the drawings is a bottom plan view of the cable management assembly of FIG. 1;

FIG. 6 of the drawings is a left side view of the cable management assembly of FIG. 1;

FIG. 7 of the drawings is a right side view of the cable management assembly of FIG. 1;

FIG. 8 of the drawings is a front view of the cable management assembly of FIG. 1;

FIG. 9 of the drawings is a rear view of the cable management assembly of FIG. 1;

FIG. 10 of the drawings is a top plan view of the cable management assembly of FIG. 1 showing a pair of cables associated therewith; and FIG. 11 of the drawings is a left side view of the cable management assembly of FIG. 1 showing cables associated therewith in a storage configuration.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIGS. 1-9 in particular, a first embodiment of cable management assembly 10 is shown as generally comprising housing 12 and cover member 14. Housing 12 is adapted for securement to a substrate, such as, but not limited to, a wall, a partition, a door, a panel-just to name a few. Housing 12 is preferably secured to the substrate via conventional fasteners (e.g., threaded fasteners, non-threaded fasteners, bolts, rods, etcetera). Housing 12 may alternatively or additionally be secured to the substrate via one or more glues, adhesives, and/or tapes being applied to one or more walls of the housing. Cover member 14 is adapted for securement to housing 12 via conventional fasteners.

Housing 12 preferably includes cavity 16 defined by top side wall 18, left side wall 20, right side wall 22, bottom side wall 24, bottom wall 26, top wall 28, and cover member 14. Cavity 16 is adapted to retain two or more cables (52/54) connected directly or indirectly. (See FIG. 10). In accordance with the present invention, displacement of the two or more connected cables positioned in the cavity is restricted such that the cables cannot become disconnected.

As is best shown in FIG. 11, the walls that define the cavity and the cover member enable at least one cable to be wrapped therearound in a hidden, stored configuration. Such a feature allows for the connected cables to remain free from damage and also provides the room with an uncluttered, organized look.

Housing 12 preferably includes first and second primary bores 30 and 32, respectively, that enable housing 12 to be secured to a substrate. Housing 12 also preferably includes first and second secondary bores 34 and 36, respectively, that enable housing 12 to be secured to a conventional receptable box via fasteners.

Top side wall 18 of housing 12 preferably includes aperture 38 that is adapted to accommodate cable while preventing a cable connector from passing therethrough.

Bottom side wall 24 of housing 12 preferably includes aperture 40 that is adapted to accommodate cable while preventing a cable connector from passing therethrough.

Bottom wall 26 of housing 12 preferably includes a pair of apertures 42 that are adapted to accommodate both a cable connector and the cable itself. Bottom wall 26 may also include one or more posts 27 that direct and/or assist in management of cables within cavity 16.

Top wall 28 of housing 12 preferably includes lip 44 (See FIG. 1) that is adapted to help retain a cable connector positioned within the cavity during installation. Lip 44 can span across the entire top wall or any portion of it. Furthermore, top wall 28 can have lip 44 omitted for a flush finish.

Top wall 28 of housing 12 also preferably includes a plurality of apertures 46 for securing the cover member thereto via fasteners 48.

In a preferred implementation of the present invention, cover member 14 includes a plurality of apertures 50. Cover member 14 may be releasably secured to housing 12 using magnetics to facilitate the enclosure instead of and/or in addition to fasteners 48.

In another preferred implementation of the present invention, the housing and cover member are independently fabricated from a material selected from the group consisting of a leather, a natural fabric, a synthetic fabric, a metal, a metal alloy, a natural resin, a synthetic resin, a plastic, a composite, and/or wood.

In a preferred operation, a user first secures one connector of first cable 52 to a TV or monitor. Second, the user feeds the second connector of cable 52 through one of the apertures of the bottom wall into the cavity. Third, the user mounts housing 12 to, for example, a wall. Fourth, the user connects second cable 54 to the first cable 52 inside the cavity. Such a connection can be direct and/or indirect using an adapter. Second cable 54 is preferably adapted to be releasably connected to a user device, such as a computer. Next, the corresponding portion of the remaining portion of the second cable is fed through the aperture of the bottom side wall. Then the cover member is secured to the housing. At this point, the cable management assembly prevents the second cable from being disconnected from the first cable, and the second cable can be wrapped around the housing and stored in a clean and organized manner. It will be understood that the first cable/cord secured to the TV or monitor is not taut for the length of displacement of the connectors in the cavity. Multiple users throughout the day can connect, for example, their computer to the second connector, and, in turn, the TV or monitor for academic and/or business presentations, viewing, sharing, etcetera. The cable management assembly of the present invention provides for cable management, and facilitate anti-theft because users cannot get to the connection point in the enclosed housing. It also reduces damage to the connectors because of the orientation and ability to be conveniently stored-instead of being left on the ground to be trampled on or otherwise damaged.

In accordance with the present invention, the cable management assembly connects two cables, each cable having a first end with a connector and a second end with a connector. Not limiting examples of cables include, HDMI cables, USB cables, power cables, audio cables, optical cables—just to name a few.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A cable management assembly, comprising:
 a housing defining an internal cavity, the housing including:
 a bottom wall;
 sidewalls extending upwardly from the bottom wall;
 a top wall having a plurality of fastener-receiving apertures;
 a first aperture in the bottom wall sized to accommodate a cable connector;
 a second aperture in one of the sidewalls sized to accommodate a cable while preventing passage of a cable connector;
 a plurality of spaced posts extending upwardly from the bottom wall within the cavity, wherein the posts are configured to route cables in a predetermined path within the cavity;
 a cover member removably securable to the housing via fasteners received in the fastener-receiving apertures of the top wall; and
 wherein the posts and cavity are configured to maintain a minimum bend radius of cables routed through the cavity.

* * * * *